United States Patent [19]

Adams

[11] 4,223,254
[45] Sep. 16, 1980

[54] POWER ASSISTED GEAR SYSTEMS

[75] Inventor: Frederick J. Adams, Clevedon, England

[73] Assignee: Cam Gears Limited, Hertfordshire, England

[21] Appl. No.: 835,228

[22] Filed: Sep. 21, 1977

[30] Foreign Application Priority Data

Sep. 23, 1976 [GB] United Kingdom ............... 39525/76

[51] Int. Cl.² ............................................ H02K 7/00
[52] U.S. Cl. ...................................... 318/2; 180/79.1
[58] Field of Search ................... 318/1, 2, 9; 180/79.1

[56] References Cited

U.S. PATENT DOCUMENTS

| | | | |
|---|---|---|---|
| 1,948,487 | 2/1934 | Berry | 180/79.1 |
| 2,021,706 | 11/1935 | Twyman | 180/79.1 |
| 2,553,795 | 5/1951 | Staude | 180/79.1 |
| 2,761,326 | 9/1956 | Herbenar et al. | 180/79.1 |
| 2,869,383 | 1/1959 | Rapp et al. | 180/79.1 |
| 3,511,104 | 5/1970 | Piat | 180/79.1 |
| 3,893,534 | 7/1975 | Steinmann | 180/79.1 |
| 3,983,953 | 10/1976 | Bayle | 180/79.1 |

*Primary Examiner*—J. V. Truhe
*Assistant Examiner*—Eugene S. Indyk

[57] ABSTRACT

A steering gear system includes a rack driven by a pinion. When the torque on the pinion reaches a predetermined level, the steering column to which the pinion is attached moves axially. The axial movement of the steering column brings a disc connected with it into electrical conductive contact with a fixed electric contact. This energizes an electric motor. Further axial movement of the steering column causes the disc to contact a friction clutch plate which is connected with a pulley driven by the electric motor. This results in frictional engagement between the disc and the friction clutch plate and a power assist from the electric motor to move the rack which is a function of the torque applied to the steering column.

11 Claims, 8 Drawing Figures

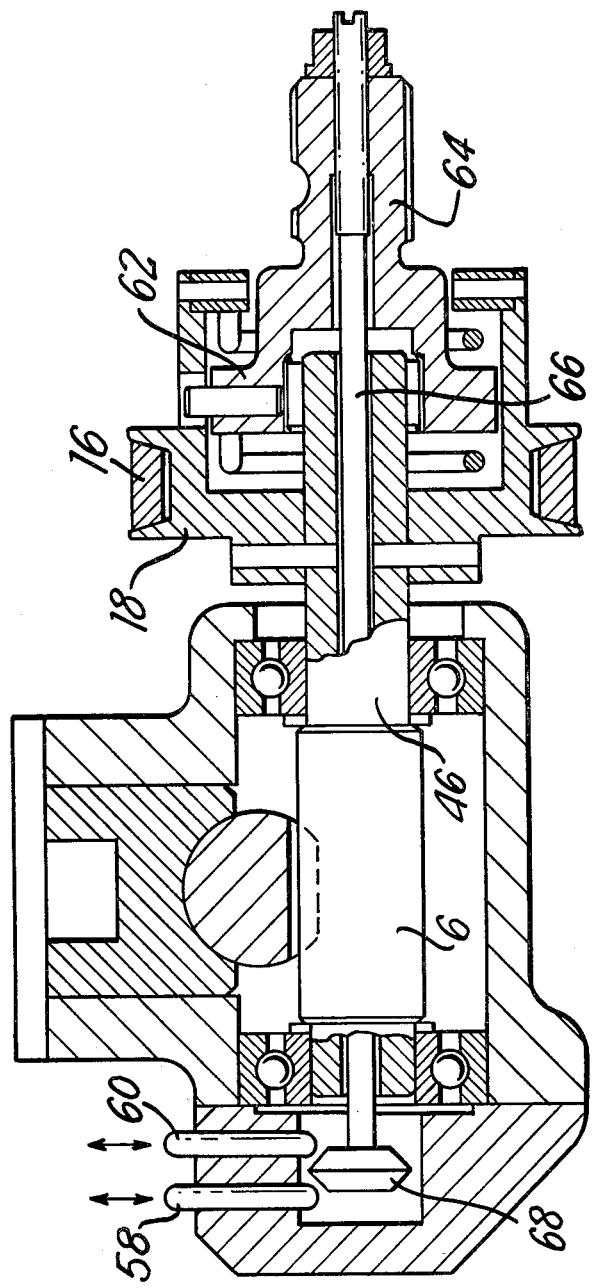

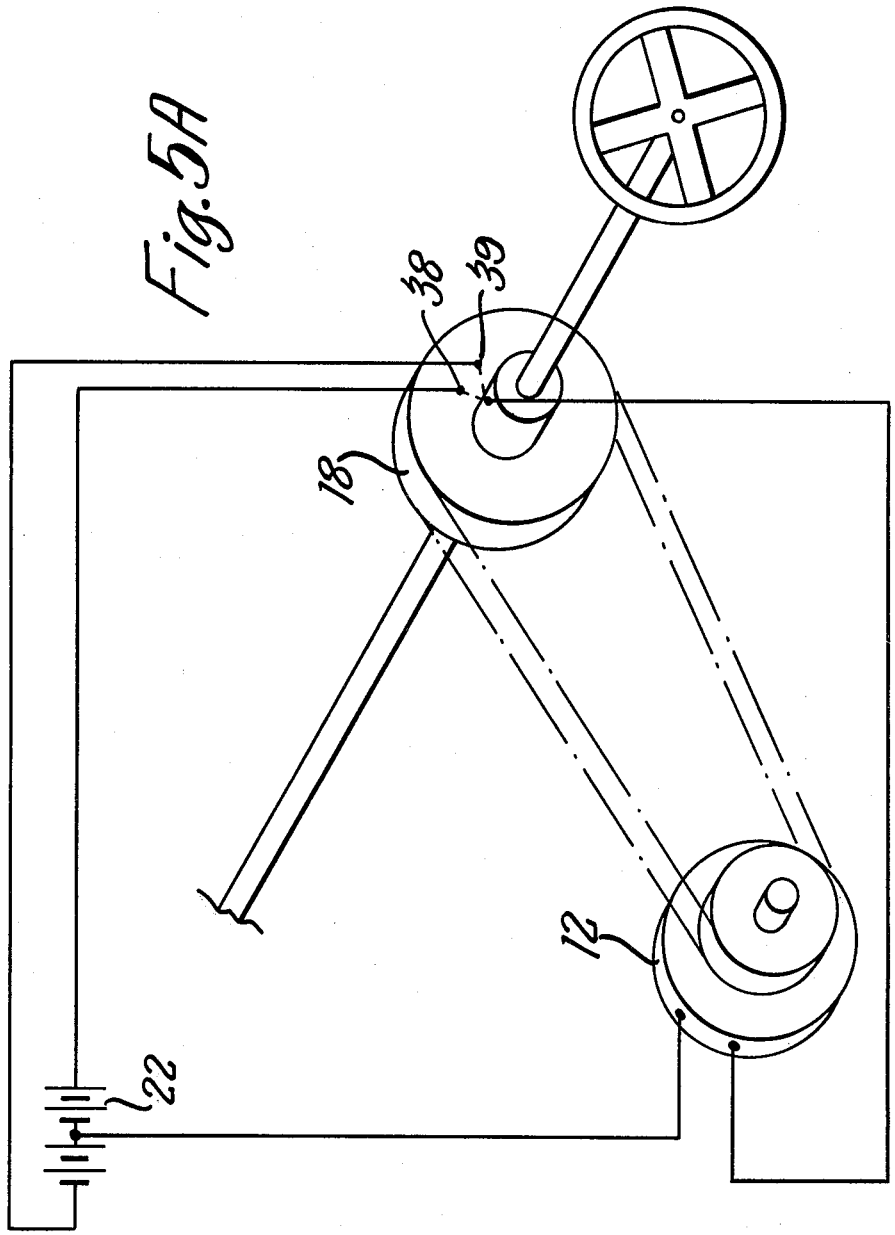

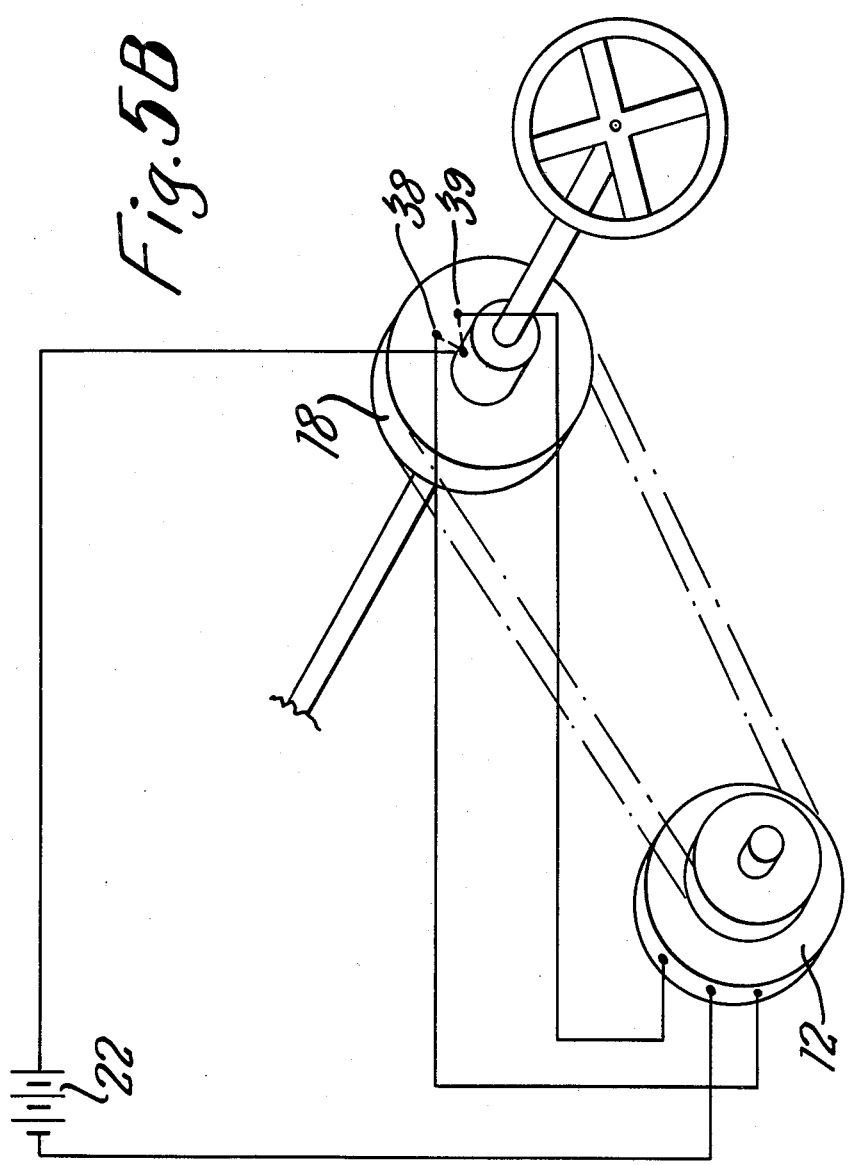

POWER ASSISTED GEAR SYSTEMS

The present invention relates to a power assisted gear system, and by gear system is meant a driving gear and a driven gear in drive-transmitting engagement with one another.

The invention is particularly concerned with, but not exclusively limited to, a gear system suitable for use in a vehicle steering system. In a conventional vehicle steering system, the steerable road wheels are steered by turning the vehicle steering wheel. The steering drive is transmitted by the steering wheel to a rack and pinion system so that rotation of the steering wheel effects translational movement of the rack bar. This rack bar movement is transmitted via conventional tie rods and linkages to the steerable road wheels.

In certain circumstances, and particularly with heavy duty vehicles, a considerable physical effort is required to carry out the desired turning movement of the steering wheel; for instance, during parking and slow speed manoeuvring. In order to overcome this problem, systems have been devised to provide power assistance for the vehicle driver so that a comparatively small turning force on the steering wheel will be sufficient to produce the required steering movement of the steerable road wheels.

In a previously proposed power-assisted steering system, a piston is mounted for movement along a cylinder to define two chambers one on either side of the piston. Rotation of the steering wheel operates a control valve to pass fluid under pressure into an appropriate one of the two above-mentioned chambers so as to move the piston along the cylinder in the direction of movement of the rack bar. The piston is connected to the rack bar so that this movement of the piston effects a corresponding movement of the rack bar. It will be appreciated that the power to move the rack bar is exerted principally by the fluid pressure in the hydraulic system and only fractionally by the turning force exerted on the steering wheel.

With the abovementioned power-assisted system, the difficulty arises that it is necessary to provide a relatively complex pressurised oil circulation system which of course must be leak-proof so that oil cannot escape from, and dirt cannot enter into, the system to contaminate the oil.

It is an aim of the invention to provide a power-assisted gear system which can be used in a vehicle steering system to alleviate the above difficulty, and accordingly there is provided a gear system comprising a driving gear and a driven gear in drive transmitting engagement with one another, an electric motor to provide power-assistance for the driving gear, and a contact means arranged to undergo translational movement in response to torque exerted on the driving gear to effect closure of the electric motor energising circuit.

The contact means may effect said closure of the electric motor energising circuit when the said torque reaches a predetermined lower value.

A preferred gear system of the invention includes a driven pulley which is rotatable by the electric motor to provide said power-assistance. This pulley may be rigidly connected to the driving gear, or alternatively the pulley may be rotatable with respect to the driving gear, and the contact means may effect drive transmitting engagement of the driven pulley and driving gear when the said torque reaches a predetermined upper value. In this way, after the contact means has started its initial movement it switches on the electric motor to drive the pulley which rotates with respect to the driving gear. Further movement of the contact means causes the driving gear to be rotated by the electrically driven pulley thereby providing power-assistance to rotate the driving gear. When the torque exerted on the driving gear is reduced, firstly the contact means disengages the driving gear from the pulley, and then the electric motor circuit is broken to de-energise the electric motor. This system ensures that the power-assistance is provided only when the torque exerted on the driving gear exceeds the said upper value. The electric motor circuit is completed or broken by operating a switch in the circuit, and, the switching means may include a terminal mounted on the contact means fixedly connected to the driving gear which is axially movable. One way of providing the required axial movement of the driving gear is to form both the driving and driven gears with helical teeth, and to mount the driving gear so that is can float in the direction of its longitudinal axis.

Alternatively, if it is not desirable to allow the driving gear to float longitudinally, the contact means can be arranged so as to be rotatable with respect to the driving gear and also movable axially with respect to the driving gear. One way of producing this axial movement is to locate a projection on the contact means in a helical or part-helical slot in the driving gear or in an extension thereof. The converse arrangement could also be provided.

In another embodiment of the invention, the contact means may comprise a rod extending through the driving gear so as to be axially movable with respect to the driving gear. A contact member is mounted on the rod at one end of the pinion to effect the required contact with the switch contacts in the electric motor circuit. The contact means is movable axially with respect to the driving gear, and the driven pulley is fixedly connected to the driving gear. Axial movement of the contact means causes the electric motor to be switched on thereby driving the pulley and the driving gear. If however the pulley is mounted so that it is rotatable with respect to the driving gear, further axial movement of the contact means brings the driving gear into drive transmitting engagement with the rotating pulley. In this arrangement, initial axial movement of the contact means produces a corresponding axial movement of the contact member to operate the switch and further axial movement of the contact means brings the driving gear into drive-transmmitting engagement with the rotating pulley, thereby providing power-assistance to rotate the driving gear.

The electrical switching for the electric motor circuit can be either single-pole or double-pole; the switch being operated mechanically by movement of the contact means. Alternatively, the contact means can operate a micro-switch which in turn operates a solenoid switch to handle the higher currents required.

Required electrical power can be provided by either a D.C. motor, a converter or an A.C. motor.

In the previously mentioned arrangements, the switching system has been used to operate the motor or converter in a required one of two opposite directions depending on the direction of the torque exerted on the driving gear. In a further arrangement however the electric motor and pulley can be arranged for rotation in only one direction. Axial movement of the contact means in one direction effects drive-transmitting engagement with the pulley as previously described so that the contact means and the pulley rotate in the same direction as one another. Axial movement of the contact means in the opposite direction brings the contact means into drive-transmitting engagement with drive reversing members so that the contact means, and hence the driving gear, is rotated in the opposite direction to the pulley.

Power assisted gear systems of the invention will now be described by way of example with reference to the accompanying drawings, in which:

FIG. 4 is a sectional elevation of another gear system forming part of the system of FIG. 1;

FIGS. 5A and 5B are diagrams of two switching systems for the gear systems of FIGS. 2 to 4;

Figure 1:
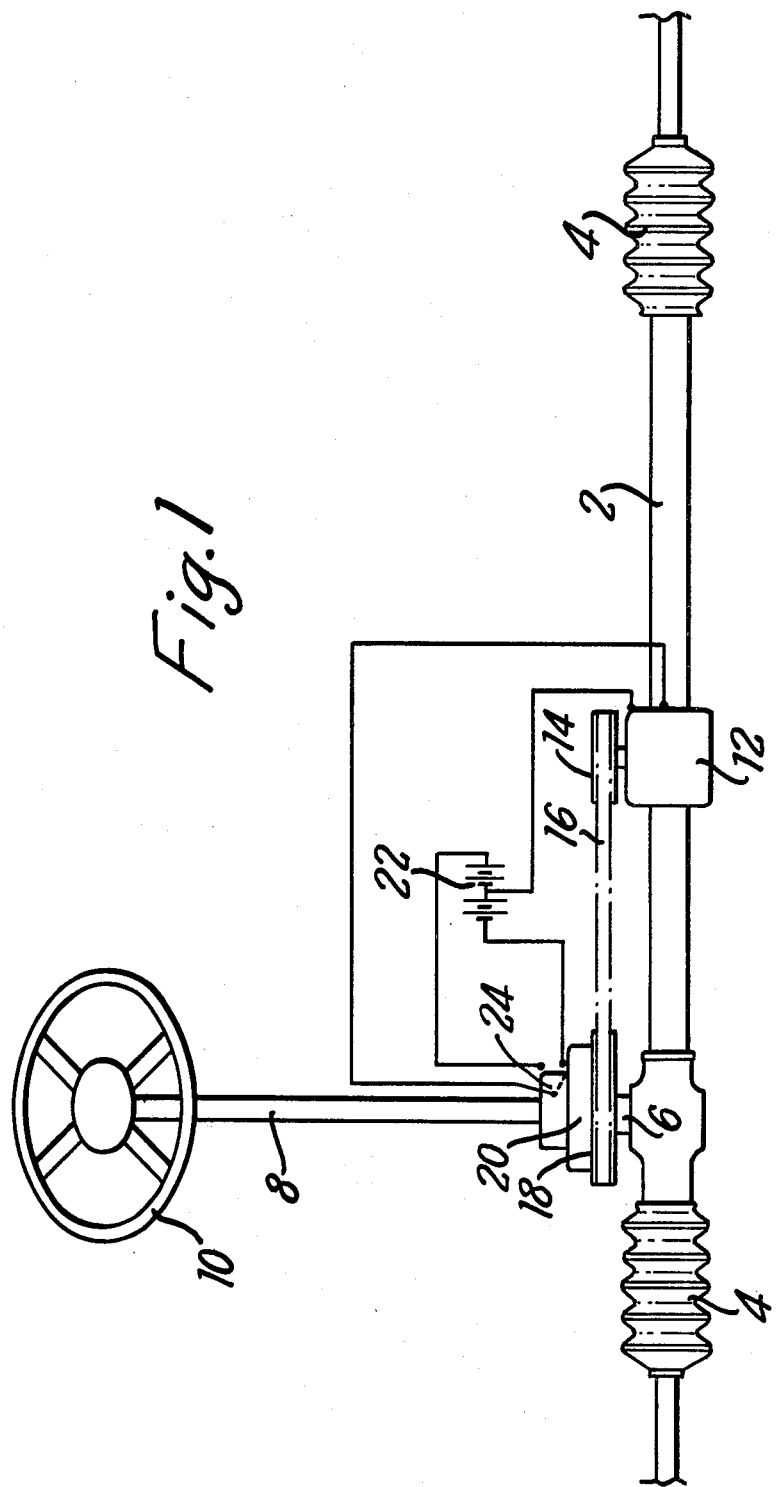
FIG. 1 is a schematic diagram of a power assisted steering system for a vehicle.

Referring particularly to FIG. 1, a vehicle steering system includes a rack bar movably mounted in a housing 2 having bellows 4 at either end, the rack bar leading to conventional tie rods and linkages which are coupled to the steerable road wheels (not shown). The rack bar is engaged by a pinion 6 located at one end of a steering column 8, and a steering wheel 10 is connected to the other end of the column 8.

A reversible electric motor 12 is mounted on the housing 2 and a driving pulley 14 of the motor 12 is connected by an endless belt 16 to a driven pulley 18 rotatably mounted on the steering column 8 so that the pulley 18 can rotate freely relative to the column 8. A clutch 20 is mounted on the column 8 adjacent to the pulley 18 to enable the pulley 18 to be brought into and out of drive-transmitting engagement with the steering column 8. The electric motor 12 is energised from a suitable power source 22 via a switch 24 adjacent to the clutch 20.

The construction of part of the steering system will now be described in more detail with reference to FIG. 2. The forward end of the steering column 8 is connected to the pinion 6 which meshes with the rack bar 26. The pinion 6 and adjacent parts of the rack bar and steering column end are located in a casing 28, and the pinion is rotatably mounted in the casing by means of bearings 30 and 32.

A contact disc 34 is mounted on the steering column end for rotation therewith, and the driven pulley 18 is mounted on the casing 28 by bearings 36 so that it may rotate freely with respect to the casing and the pinion 6. A groove is located in the circumference of the driven pulley 18 to receive the belt 16 from the electric motor 12, and the energising circuit for the electric motor includes contacts 38 and 39 mounted within the pulley 18. Clutch pads 40 and 41 are also mounted within the pulley 18 on either side of the disc 34 and at a greater distance from the disc 34 than the contacts 38 and 39.

The end of the steering column 8 and the pinion 6 are arranged so that they may "float" axially within the casing 28 against the action of plate or coil return springs 42 and 43. The meshing teeth on the pinion 6 and rack bar 26 are helical, and the rack bar is maintained in firm engagement with the pinion by a yoke 44.

Figure 2:
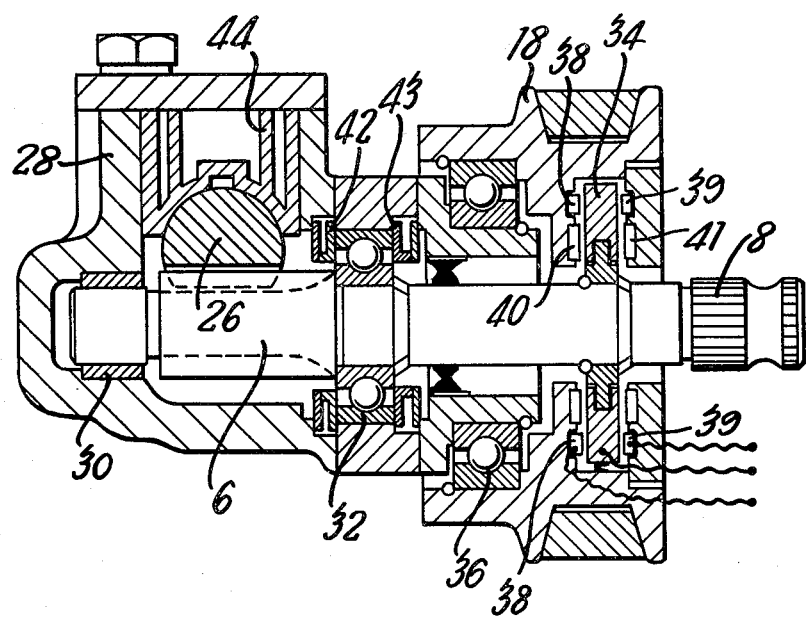
FIG. 2 is a sectional elevation of a gear system forming part of the steering system of FIG. 1.

In operation, the relevant parts of the steering gear system have the positions illustrated in FIG. 2. As soon as the vehicle driver applies a torque to the steering wheel 10 the pinion 6 exerts a thrust on the rack 26. The rack bar moves longitudinally to produce the required steering movement of the road wheels, and the pinion 6 remains in the axial position illustrated in FIG. 2. If the torque on the pinion 6 reaches a minimum threshold value, it causes the pinion 6 and of course the steering column 8 to move axially, say for example to the left in FIG. 2. If the torque rises to a first predetermined value, the disc 34 has moved sufficiently to touch the contact 38 thereby energising the electric motor 12 to rotate the pulley 18. If the torque continues to rise to a second predetermined value, the disc 34 moves further to make a firm contact with the clutch pad 40 thereby bringing the disc 34 and hence the steering column 8 and pinion 6 into drive-transmitting relationship with the pulley 18. This causes the electric motor to rotate the pinion thereby providing power assistance to move the rack bar and produce the required steering movement of the road wheels. As soon as the power assistance is sufficient to reduce the torque exerted on the pinion 6 below the previously-mentioned upper and lower values, then the disc 34 is returned to its illustrated position by the springs 42 thereby disengaging the disc 34 from the pulley 18 and de-energising the electric motor 12.

The rotational speed of the pulley 18 is kept at a low value of the order of one revolution per second, and if the pulley 18 should drive the steering column 8 at an excessive speed, the torque exerted on the pinion 6 is immediately reduced thereby disengaging the pulley 18 and the disc 34 and switching off the electric motor 12.

It will be appreciated that the pulley 18 could be located at the opposite end of the pinion 6 to that shown in FIG. 2, and that the floating bearing 32 and springs 42 and 43 could also be located at this opposite end of the pinion.

Figure 3:
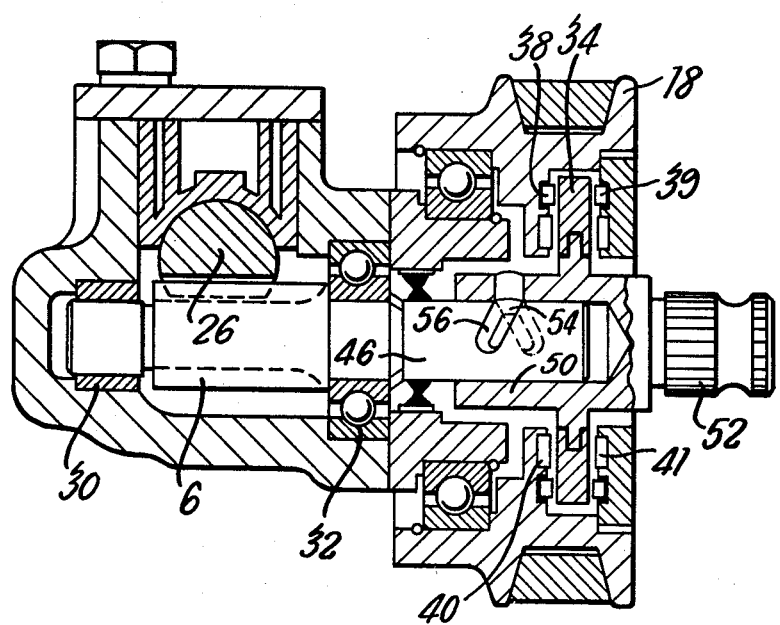
FIG. 3 is a sectional elevation of another gear system forming part of the system of FIG. 1.

As previously mentioned, the pinion 6 and bearings 30 and 32 are allowed to float in the casing 28 in order to produce the required axial movement of the disc 34. FIG. 3 illustrates a gear system which operates without axial movement of the pinion 6. FIG. 3 illustrates a gear system which is basically similar to the system of FIG. 2, and for clarity corresponding having the same basic function have been given the same reference numerals.

In FIG. 3, the pinion 6 and a rod-like extension 46 rigidly connected thereto are rotatably mounted in the casing 28 against axial movement by the bearings 30 and 32. A contact disc 34 is formed integrally with a tubular sleeve 50 which makes an easy sliding fit over the extension 46; this sleeve 50 having an end stub 52 adapted for connection to the vehicle steering column (not shown). An inwardly extending peg 54 of the sleeve 50 engages a part-helical slot or recess 56 in the extension 46. The pulley 18, electrical contacts 38 and 39, and clutch pads 40 and 41 are basically similar in construction and operation to those of the system illustrated in FIG. 2.

In operation, if the torque exerted by the driver on the pinion 6 exceeds a minimum threshold value, the sleeve 50 moves axially along the extension 46 with the peg 54 following the path of the slot 56. As with the system of FIG. 2, the contact disc 34 touches firstly the appropriate electrical contact of the energising circuit, and then the appropriate clutch pad to bring the contact disc, and hence the pinion 6, into drive-transmitting engagement with the pulley 18 to provide the required power assistance. Of course, if the steering wheel is turned in the opposite direction then the sleeve 50 is moved axially in the opposite direction if the torque should exceed the above-mentioned minimum threshold value.

FIG. 4 illustrates a modified gear system in which contacts 58 and 60 for the electric motor are located at the forward end of the pinion 6. The system includes a disc 62 extending from a sleeve 64 which is generally similar to the disc 34 and sleeve 50 of FIG. 3. This sleeve 64 is axially and rotationally movable relative to the pinion extension 46 by means of a peg and slot arrangement similar to that illustrated in FIG. 3. A contact rod 66 extends through a bore through the centre of the pinion 6 and its extension 46 so as to be rotatable therein, and has its rear end rigidly and adjustably connected to the sleeve 64 and its forward end connected to a contact member 68 located between the two contacts 58 and 60. The system includes the previously described driven pulley 18 coupled by the belt 16 to the electric motor (not shown) and this pulley 18 is rigidly mounted to the pinion extension 46.

In operation, when the input torque rises to the predetermined value, the sleeve 64 and hence the contact rod 66, moves axially with respect to the pinion 6 causing the contact member 68 to make contact with one of the two contacts 58 and 60. This energises the electric motor to rotate the pulley 18 in the appropriate direction thereby providing the required power assistance. Obviously, when the torque decreases below the above-mentioned value, the sleeve 64 returns to its illustrated position, and on rotating the steering wheel in the opposite direction the sleeve 64 and the contact rod 66 move in the opposite axial direction causing the contact member 68 to touch the other one of the two contacts 58 and 60.

If desired, the pulley 18 can be rotatably mounted with respect to the pinion extension 46 similarly to the system illustrated in FIG. 3, and the system can be arranged so that further axial movement of the disc 62 after the appropriate contact has been touched will cause the disc 62 to contact an appropriate clutch pad on the pulley 18 thereby bringing the disc and hence the pinion 6 into drive-transmitting engagement with the pulley 18.

FIG. 5 illustrates two single-pole switch systems for the gear systems of FIGS. 2 to 4. Referring to FIG. 5A, the opposite terminals of the power source 22 are connected to respective contacts 38 and 39 on the driven pulley 18. A centre tap on the power source 22 is connected to one terminal of the electric motor 12, and the other terminal of the motor 12 is connected to a terminal on the contact disc 34.

Axial movement of the pinion 6 causes the terminal on the contact disc 34 to touch the contact 38 thereby completing the circuit through one-half of the power source 22 to drive the pinion 6 in one direction. Rotation of the steering wheel in the opposite direction produces axial movement of the pinion 6 in the opposite direction causing the terminal on the contact disc 34 to touch the contact 39. This completes the electrical circuit through the other half of the power source 22 causing the pinion 6 to be driven in the opposite direction.

FIG. 5B is a diagram of a slightly different circuit in which opposite terminals of the electric motor 12 are connected respectively to the contacts 38 and 39. The terminal on the contact disc 34 is connected to one pole of the power source 22, and the other pole of the power source 22 is connected to a centre tap on the electric motor 12. Rotation of the steering wheel in one direction causes the terminal on the contact disc 34 to touch the contact 38. This completes the circuit through one-half of the electric motor thereby driving the pinion 6 in one direction. Rotation of the steering wheel in the opposite direction completes the circuit through the other half of the motor 12 thereby driving the pinion 6 in the opposite direction.

Figure 6:
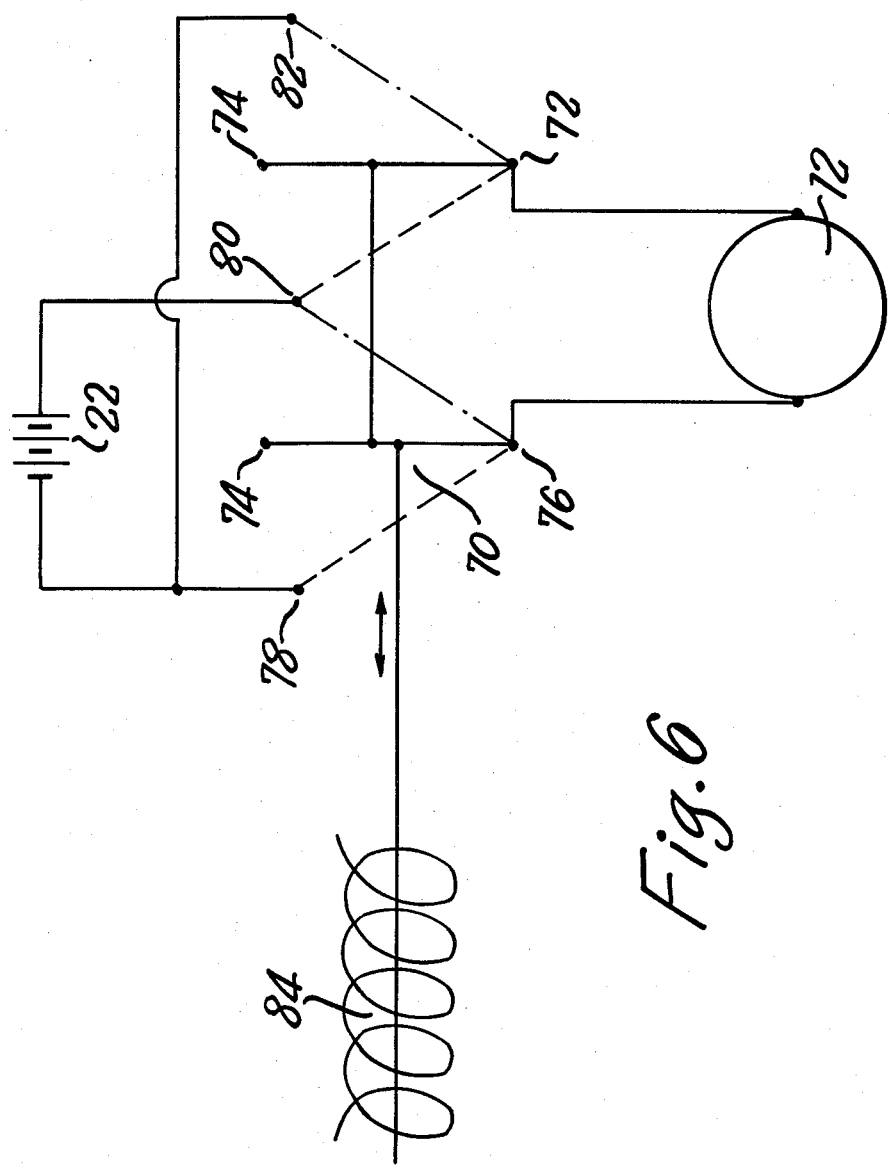
FIG. 6 is a diagram of a further switching system for the gear systems of FIGS. 2 to 4.

FIG. 6 is a circuit diagram of a double-pole switching circuit for the gear system of FIGS. 2 to 4. A power source 22 is connected to the electric motor 12 by a double-pole switch 70. This switch 70 includes a pair of switch arms 74 which are movable with the contact disc 34 to connect the terminals 72 and 76 to either terminals 78 and 80 or the terminals 80 and 82 respectively. The terminals 78, 80 and 82 are mounted on the driven pulley 18, the terminal 78 is connected to the terminal 82, the power source 22 is connected to the terminals 78 and 80 and the electric motor 12 is connected to the terminals 72 and 76.

On turning the steering wheel in one direction the switch arms 74 contact the terminals 78 and 80 thereby completing the circuit to drive the pinion 6 in one direction. On rotating the steering wheel in the opposite direction, the switch arms 74 contact the terminals 80 and 82 causing the pinion 6 to be driven in the opposite direction. If desired, movement of the contact disc 34 in response to rotation of the steering wheel can operate a micro-switch which operates a solenoid 84 thereby operating the switch 70.

Figure 7:
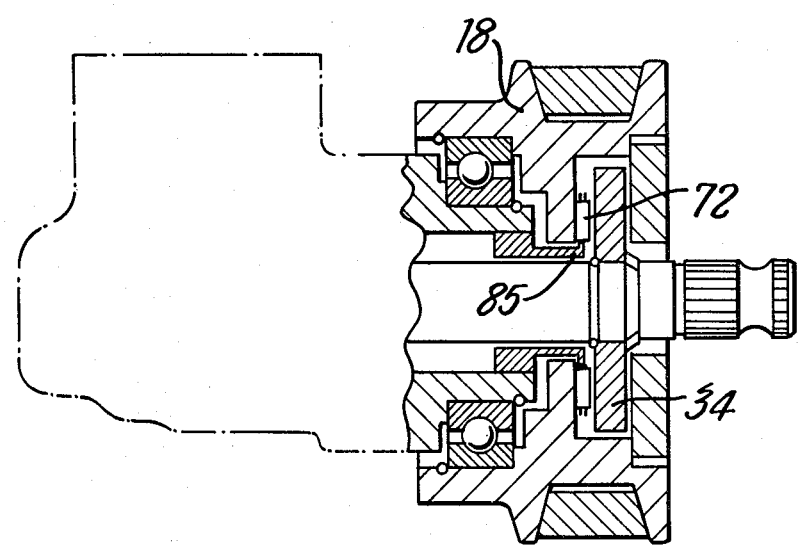
FIG. 7 is a sectional elevation of part of a further gear system forming part of the steering system of FIG. 1.

The circuits illustrated in FIGS. 5 and 6 are arranged to drive the electric motor 12 and the driven pulley 18 in either one of two opposite directions. FIG. 7 illustrates a gear system in which the pinion 6 can be driven in either one of two opposite directions even though the driven pulley 18 is rotated in only one direction. The gear system of FIG. 7 is basically similar to that of FIG. 2 and corresponding components have been given the same reference numerals.

Referring to FIG. 7, a series of radially extending rollers 72 are rotatively mounted in a fixed stationary cage 85. When the steering wheel is turned, if the torque is exerted in a direction to move the contact disc 34 to the right then the disc 34, and hence the pinion 6, moves into drive-transmitting engagement with the pulley 18. If the direction of torques moves the disc 34 to the left, the disc contacts the rollers 72 which are thereby pressed against the pulley 18 and caused to rotate about their own axis driving the pinion 6, in the opposite direction to the pulley 18.

What we claim is:

1. An apparatus comprising a rotatable shaft and means for providing a power assistance to rotate said shaft, said power assistance means including torque responsive means for moving said shaft axially to an extent which is a function of a torque applied to said shaft, drive means for providing power to assist the rotation of said shaft, said drive means including a reversible electric motor, electric contact means associated with said shaft for providing a flow of electric power to said drive means in response to a predetermined amount of axial movement of said shaft, said electric contact means including a first contact axially movable with said shaft and a left and right contact, said first contact being formed of two concentric annular surfaces on a disc fixedly connected with and coaxial with said shaft, said two annular surfaces being located on opposite sides of said disc, said left and right contacts being disposed on opposite sides of said first contact and connected with said reversible electric motor to effect rotation of said reversible electric motor in opposite directions upon contact with said first contact, and clutch means for transmitting power from said drive means to said shaft.

2. An apparatus as set forth in claim 1 wherein said clutch means includes left and right clutch plates formed of concentric annular discs coaxial with said shaft, and said left and right contacts are formed of concentric annular discs coaxial with said clutch plates and said shaft.

3. An apparatus comprising a rotatable shaft and means for providing power assistance to rotate said shaft, said power assistance means including a torque responsive means for moving said shaft axially to an extent which is a function of a torque applied to said shaft, drive means for providing power to assist the rotation of said shaft, electric contact means associated with said shaft for providing a flow of electric power to said drive means in response to a predetermined amount of axial movement of said shaft, and clutch means for transmitting power from said drive means to said shaft, said clutch means including a disc fixedly connected with and coaxial with said shaft, said drive means including a reversible electric motor and a pulley driven by said reversible electric motor, said pulley having a central passage through which said shaft extends and surface means defining a cavity extending radially outward from said central passage and in which said disc is received, said electric contact means including said disc and a left and right contact disposed on opposite faces defining said cavity and connected with said reversible electric motor to effect rotation of said motor in opposite directions upon axial movement of said shaft in opposite directions from a central position.

4. An apparatus as set forth in claim 3 wherein said clutch means includes said disc and a left and right clutch plate disposed on opposite faces defining said cavity, said disc engaging one of said left and right clutch plates upon axial motion in one direction from said central position and the other one of said clutch plates upon axial motion in the opposite direction.

5. An apparatus as set forth in claim 4 wherein said left contact is disposed closer to a radially extending surface of said disc than said left clutch plate, and said right contact is disposed closer to said disc than said right clutch plate whereby upon axial motion in either direction said disc engages one of said left and right contacts before engaging a corresponding one of said clutch plates.

6. An apparatus as set forth in claim 5 wherein said shaft includes a cylindrical portion and a tubular portion in which at least part of said cylindrical portion is received, and said torque responsive means for moving said shaft axially as a function of a torque applied to said shaft includes surfaces means defining a helical recess in said cylindrical portion and a peg fixedly connected with said tubular portion and received in said recess.

7. An apparatus as set forth in claim 6 further including spring means for biasing said shaft against motion in either axial direction and for maintaining said disc in a central position in which it is free of contact with said left and right contacts and said left and right clutch plates until the torque applied to said shaft exceeds a predetermined minimum.

8. An apparatus as set forth in claim 5 wherein said torque responsive means for moving said shaft axially to an extent proportional to a torque applied to said shaft includes a pinion gear having helical gear teeth fixedly connected with said shaft and a rack disposed in meshing engagement with said pinion gear.

9. An apparatus as set forth in claim 8 further including spring means for biasing said shaft against motion in either axial direction and for maintaining said disc in a central position in which it is free of contact with said left and right contacts and said left and right clutch plates until the torque applied to said shaft exceeds a predetermined minimum.

10. An apparatus comprising a rotatable shaft and means for providing power assistance to rotate said shaft, said power assistance means including an electric motor and means for transmitting power from said electric motor to said shaft, circuit means for supplying power to said electric motor, said circuit means including a disc fixed to said shaft for rotation therewith and an electric contact axially spaced from said disc, means for establishing electrically conductive contact between said disc and said electric contact as said disc and shaft rotate by moving said disc and shaft axially in response to rotation of said shaft thereby to enable a flow of electric power to said electric motor.

11. An apparatus as set forth in claim 10 wherein said means for transmitting power from said electric motor to said shaft includes a drive member driven by said motor and clutch means for connecting said drive member with said shaft, said drive member being mounted for rotation about the central axis of said shaft, said clutch means including a clutch pad connected with said driven member and an annular surface of said disc, said clutch pad being axially spaced from said disc when said disc is free of contact with said electric contact and said clutch pad frictionally engaging said annular surface of said disc when said disc moves axially in response to rotation of said shaft.

* * * * *